United States Patent
Pedrazzani et al.

(10) Patent No.: US 10,816,369 B2
(45) Date of Patent: Oct. 27, 2020

(54) METHODS AND APPARATUS FOR INTERFEROMETRIC INTERROGATION OF AN OPTICAL SENSOR

(71) Applicant: LUNA INNOVATIONS INCORPORATED, Roanoke, VA (US)

(72) Inventors: Janet Renee Pedrazzani, Newton, NJ (US); Matthew Davis, Roanoke, VA (US); Evan M. Lally, Blacksburg, VA (US)

(73) Assignee: Luna Innovations Incorporated, Roanoke, VA (US)

(*) Notice: Subject to any disclaimer, the term of this patent is extended or adjusted under 35 U.S.C. 154(b) by 0 days.

(21) Appl. No.: 16/185,127

(22) Filed: Nov. 9, 2018

(65) Prior Publication Data

US 2020/0025592 A1     Jan. 23, 2020

Related U.S. Application Data

(63) Continuation of application No. 15/500,243, filed as application No. PCT/US2015/042439 on Jul. 28, 2015, now Pat. No. 10,161,768.

(60) Provisional application No. 62/030,793, filed on Jul. 30, 2014.

(51) Int. Cl.
   *G01B 9/02*     (2006.01)
   *G01D 5/353*    (2006.01)
   *G01L 1/24*     (2006.01)

(52) U.S. Cl.
   CPC .......... *G01D 5/35306* (2013.01); *G01L 1/242* (2013.01)

(58) Field of Classification Search
   CPC .......... G01D 5/35306; G01D 5/35312; G01D 5/35383; G01L 1/242; G01L 9/0079; G01B 2290/25; G01B 2290/45; G01B 9/02004; G01B 9/02007; G01B 11/161; G01H 9/006; G02B 26/001
   See application file for complete search history.

(56) References Cited

U.S. PATENT DOCUMENTS

| | | | |
|---|---|---|---|
| 5,301,001 | A  | 4/1994  | Murphy et al. |
| 7,561,276 | B2 | 7/2009  | Boyd |
| 2005/0244096 | A1 | 11/2005 | Jeffers |
| 2006/0204164 | A1 | 9/2006  | Ivtsenkov |

(Continued)

FOREIGN PATENT DOCUMENTS

WO     WO 2013/085833     6/2013

OTHER PUBLICATIONS

Absolute Phase Measurement in Extrinsic Fabry-Perot Optical Fiber Sensors Using Multiple Path-match Conditions, Chang and Sirkis, Experimental Mechanics, Mar. 1997, vol. 37, Issue 1, pp. 26-32 (Year: 1997).*

(Continued)

*Primary Examiner* — Tarifur R Chowdhury
*Assistant Examiner* — Jonathon Cook
(74) *Attorney, Agent, or Firm* — Nixon & Vanderhye P.C.

(57) ABSTRACT

A high-speed interrogation system is provided for interferometric sensors, one example of which is an EFPI sensor, that operates based on spectral interference. The system uses a two mode operation that includes a lower speed, accurate absolute measurement mode and a higher speed, relative measurement mode. The system achieves greater overall measurement accuracy and speed than known sensor interrogation approaches.

24 Claims, 11 Drawing Sheets

(56) References Cited

U.S. PATENT DOCUMENTS

| | | | |
|---|---|---|---|
| 2007/0165238 A1* | 7/2007 | Boyd | G01L 1/242 356/478 |
| 2009/0103100 A1 | 4/2009 | Froggatt et al. | |
| 2010/0145648 A1 | 6/2010 | Moore et al. | |
| 2010/0302549 A1 | 12/2010 | Menezo | |
| 2011/0164254 A1 | 7/2011 | Ghislain | |
| 2011/0211198 A1 | 9/2011 | Koda | |
| 2012/0044500 A1* | 2/2012 | Kuramoto | G01B 9/02007 356/498 |
| 2015/0019160 A1 | 1/2015 | Thurner | |

OTHER PUBLICATIONS

U.S. Appl. No. 15/500,243, filed Jan. 30, 2017, Inventor: Pedrazzani et al.
Office Action dated Jan. 19, 2018 in U.S. Appl. No. 15/500,243, 21 pages.
International Search Report for PCT/US2015/042439, dated Apr. 11, 2016, 3 pages.
Written Opinion of the ISA for PCT/US2015/042439, dated Apr. 11, 2016, 5 pages.
International Preliminary Report on Patentability dated Feb. 9, 2017 in PCT/US2015/042439, 7 pages.
K. A. Murphy et al, "Quadrature phase-shifted, extrinsic Fabry-Perot optical fiber sensors" *Optics Letters*, vol. 16, No. 4, Feb. 15, 2991, pp. 273-275.
T. Yoshino et al, "Fiber-Optic Fabry-Perot Interferometer and Its Sensor Applications" *IEEE Transactions on Microwave Theory and Techniques*, vol. MTT-30, No. 10, Oct. 1982, pp. 1612-1621.
H.F. Taylor, "Fibre Optic Sensors Based upon the Fabry-Perot Interferometer" *Fiber Optic Sensors Second Edition*, 2008, pp. 41-74.
Ocean Optics, Maya2000 and Maya 2000-Pro Spectrometers: Installation and Operation Manual, Ocean Optics, Inc., 2001, 34 pages.
P. Morris et al, "A Fabry-Perot fiber-optic ultrasonic hydrophone for the simultaneous measurement of temperature and acoustic pressure" *Journal of the Acoustic Society of America*, vol. 125, Jun. 2009, pp. 3611-3622.
X. Zou et al, "Miniature Fabry-Perot Fiber Optic Sensor for Intravascular Blood Temperature Measurements" *IEEE Sensors Journal*, vol. 13, No. 6, Jun. 2013, pp. 2155-2160.
Newport Corporation, "New Focus: Tunable Diode Lasers" Jun. 2014, 28 pages.
J. Hanson "Evaluation of Fiber Optic Technology for Advanced Reactor Instrumentation" Undergraduate Honors Thesis, The Ohio State University, Department of Mechanical Engineering, 2010, 84 pages.
S.E. Watkins et al, "Assessment of an instrumented reinforced-concrete bridge with fiber-reinforced-polymer strengthening" *Optical Engineering*, vol. 46, No. 5, May 2007, pp. 1-10.
Superlum, "Superluminescent Diodes" SLDs Product Overview, http://www.superlumdiodes.com/sld_overview.htm accessed Jul. 24, 2014.
J.L. Santos et al, "Optical fiber sensing with a low-finesse Fabry-Perot cavity" *Applied Optics*, vol. 31, No. 34, Dec. 1, 1992, pp. 7361-7366.
P. Handel, "Evaluation of a Standardized Sine Wave Fit Algorithm" Jun. 13-15, 2000, 4 pages.
B.H. Lee et al, "Interferometric Fiber Optic Sensors" *Sensors* 2012, vol. 12, Feb. 23, 2012, pp. 2467-2486.
Jsteinhardt, "Academically Interesting, Least Squares and Fourier Analysis" http://jsteinhardt.wordpress.com/2010/08/08/22/least-squares-and-fourier-analysis/ accessed Jul. 24, 2014, 9 pages.
M. Bertocco et al, "Sine-Fit Versus Discrete Fourier Transform-Based Algorithms in SNR Testing of Waveform Digitizers" *IEEE Transactions on Instrumentation and Measurement*, vol. 46, No. 2, Apr. 1997, pp. 445-448.
J.O. Smith III et al, "PARSHL: An Analysis/Synthesis Program for Non-Harmonic Sounds Based on a Sinusoidal Representation" *Proceedings of the International Computer Music Conference(ICMC-87)*, Aug. 23-26, 1987, pp. 1-22.
F. Shen et al, "Frequency-estimation-based signal-processing algorithm for white-light optical fiber Fabry-Perot interferometers" *Applied Optics*, vol. 44, No. 25, Sep. 1, 2005, pp. 5206-5214.
A. Ezbiri et al, "Passive signal processing for a miniature Fabry-Perot interferometric sensor with a multimode laser-diode source" *Optics Letters*, vol. 20, No. 17, Sep. 1, 1995, pp. 1818-1820.

\* cited by examiner

60 μm gap

120 μm gap

METHODS AND APPARATUS FOR INTERFEROMETRIC INTERROGATION OF AN OPTICAL SENSOR

PRIORITY APPLICATIONS

This application is a continuation of U.S. application Ser. No. 15/500,243, filed Jan. 30, 2017, which is the U.S. national phase of International Application No. PCT/US2015/042439 filed Jul. 28, 2015, which designated the U.S. and claims the benefit of U.S. provisional patent application 62/030,793, filed on Jul. 30, 2014, the entire contents of each of which are hereby incorporated herein by reference.

GOVERNMENT RIGHTS

This invention was made with Government support under Contract No. FA8650-14-C-2529 awarded by the United States Air Force. The Government has certain rights to the invention.

BACKGROUND AND PROBLEM RECOGNITION

The technology in this application relates to optical measurement apparatus and techniques.

FIG. 1 shows a schematic block diagram of an interferometric sensor arrangement 10. An input-output fiber 11 (e.g., a single mode fiber) conducts light from a light source, e.g., a laser source 12, via a coupler 14 to an interferometric sensor 13 (e.g., an EFPI sensor or transducer). A detector 16 detects light reflected back from the sensor 13 via the coupler 14 over fiber 15 (e.g., a single mode fiber 15).

Extrinsic Fabry Perot Interferometer (EFPI) sensors are based on the change in the optical length of a low-finesse Fabry-Perot cavity with respect to an applied measurand. FIG. 2 shows an example EFPI strain gauge sensor 10 that includes an optical fiber 11 inserted into one end of a silica capillary tube 21 used to add structure and prevent debris from entering a cavity or gap 24 formed between the end of the optical fiber and a reflective surface inserted into the other end of the capillary tube. The cavity or gap 24 is formed between the flat endface of the transmitting fiber 11 indicated at reference reflection ($R_1$) and a sensing reflection ($R_2$) surface appropriate for the application, which in this example is the surface of a fiber or reflective object 22 is inserted into the opposing end of the capillary tube 21.

The width of the Fabry-Perot cavity 14, referred to as a gap, is measured by interrogating the sensor 10 with a light source which reflects off both the fiber endface ($R_1$) and the surface ($R_2$) of the transducer 16 and interpreting the resulting interference pattern. When the light arrives at the source fiber end-face, a portion is reflected off the interface caused by differing indices of refraction between the fiber and the transparent media (R1) and the remaining light propagates through a cavity or gap with a second reflection occurring at the media/fiber interface (R2). The distance between R1 and R2 is same as the length of the gap and is one half of an optical path length. In an interferometric sense, R1 is the reference reflection, and R2 is the sensing reflection. These reflective signals interfere constructively or destructively based on wavelength and the optical path length difference between the reference and sensing fibers. Small movements from environmental or other physical forces cause a change in the cavity or gap length causing a phase difference between the sensing and reference waves producing interference patterns called "fringes." The sensitivity to changes in gap length is proportional to the visibility of the interference fringes reflected back into the input fiber. Example interference fringes (intensity v. optical frequency) are shown in FIG. 3A for a 60 µm gap and in FIG. 3B for a 120 µm gap; the optical frequency spacing of the interference fringes is inversely proportional to the gap width.

EFPI technology may be used to monitor a wide variety of parameters in various environments (including harsh environments) such as strain, temperature, pressure, shear, acceleration, electrical/magnetic field, radiation magnitude and radiation types, humidity, chemical constituents, and any other measurable parameters (sometimes called the measurand). Example advantages of EFPI sensors include high temperature operation, small size, and immunity to electrical noise.

EFPI sensors may be analyzed using interrogation systems generally falling into one of two categories of systems: 1) high update rate interrogation systems that make fast relative measurements but have less absolute accuracy, and 2) low update rate absolute interrogation systems that provide more accurate results using a wide range of wavelength data requiring more extensive processing and interrogation time than the high update rate interrogation systems, which reduces the time between measurements.

Wide-spectrum optical emitters, which may be white-light sources such as light emitting diodes (LEDs) or highly coherent light sources such as swept-wavelength lasers, can produce absolute measurements of the optical path length of the Fabry-Perot cavity or gap. Interrogation systems based on white-light optical sources launch a broad range of optical frequencies into the sensing fiber at the same time. Reflected data is collected with a spectrometer to produce a measurement interference signal intensity vs. laser optical frequency. The speed of an interrogation system based on a white-light optical source is limited by the required integration time of the spectrometer, which is dependent on overall signal intensity and range and may typically be on the order of 1 ms to produce a measurement.

EFPI sensors may also be interrogated using tunable laser sources with wide tuning ranges. In this scheme, the laser's optical frequency is swept across a range. As the laser's frequency changes, the interference signal's intensity varies sinusoidally. This sinusoidal signal is collected at a photodetector and converted from the time domain to the spectral domain using the known rate of laser frequency sweep. The speed of data collection is limited by the sweep range and rate of the tunable laser. The speed of an interrogation system based on typical high-speed tunable lasers may be approximately on the order of 50 ms to produce a measurement.

Amplitude-based approaches can increase the speed of EFPI interrogation. Amplitude-based schemes do not directly generate wide wavelength ranges of spectral domain data. Using one or more narrowband lasers, an amplitude-based scheme monitors the change in reflected signal amplitude(s) vs. time using simple photodetectors. By simplifying the detection scheme—the lasers are continuously emitting, and the photodetectors are continuously collecting data—amplitude-based interrogators can achieve high update rates. A primary limitation of measurement speed is the bandwidth of the photodetector and acquisition electronics.

A simple amplitude-based interrogator uses a fringe-counting scheme. A single, narrowband laser emits light at a fixed frequency for interrogating an EFPI sensor. When the sensor's gap changes at a constant rate, the intensity of the return signal varies sinusoidally with time. Assuming a monotonic change in the measurand during the time period of interest, the total change in the measurand may be determined in part by counting the number of times the intensity reached a maximum value (the number of fringes produced by the total change in the gap length) plus the fraction of the next fringe generated. This fringe counting method provides only a relative, rather than an absolute, measurement of gap displacement. In addition, the accuracy of this relative measurement suffers when the detected intensity is in the vicinity of a maximum or minimum. This is due to a lower rate of intensity change with phase at the extrema of a sine wave as compared with the linear, rapidly changing regions of the waveform.

What is needed is a system that is capable of producing highly accurate absolute measurements of an interferometric (e.g., EFPI) sensor while also obtaining high update rates.

SUMMARY

A high-speed interrogation system is provided for interferometric sensors, one example of which is an EFPI sensor, that operates based on spectral interference. The system uses a two mode operation that includes a lower speed, accurate, absolute measurement mode and a higher speed, relative measurement mode. The system achieves greater overall measurement accuracy and speed than known sensor interrogation approaches.

Example embodiments include measuring methods and apparatus for use with an interferometric sensor. In a first operational mode, light is provided over a range of source wavelengths to the interferometric sensor. The intensity of the interference signal produced by the interferometric sensor over the range of wavelengths is converted to an electrical amplitude signal at the detector and is measured. An absolute measurement of an optical path length associated with the interferometric sensor is determined based on the measured amplitude response over the source wavelength range. The optical path length varies depending on one or more physical parameters to be measured using the interferometric sensor. In a second operational mode, light at a first predetermined wavelength and at a second different predetermined wavelength is provided to the interferometric sensor. The first and second wavelengths are chosen such that there is a predetermined difference in the sensor interference fringe phase at the first and second wavelengths. A first amplitude response of an interferometric signal produced by the interferometric sensor at the first predetermined wavelength is measured. A second amplitude response of an interferometric signal produced by the interferometric sensor at the second predetermined wavelength is measured. A difference between the first and second amplitudes is determined. A relative optical path length change based on the difference is determined. The absolute optical path length is combined with the relative optical path length change to determine a current absolute optical path length. A signal corresponding to the current absolute optical path length is generated that equates to a current sensor measurand value or from which a current sensor measurand value is determined.

In example implementations, the second wavelength is modified so that the predetermined difference in the sensor interference fringe phase at the first and second wavelengths is maintained. The modifying may be based on the determined relative optical path length change, and the predetermined phase in the sensor interference fringe phase is a quadrature phase or a known phase other than an integer multiple of 180 degrees.

In example implementations, a multiplexing technique is applied to determine the first and second amplitude responses of an interferometric signal produced by the interferometric sensor at the first and second predetermined wavelengths, respectively.

In example implementations, the interferometric signal produced by the interferometric sensor at the first predetermined wavelength is bandpass filtered in the optical spectrum to pass the first amplitude response of an interferometric signal produced by the interferometric sensor at the first predetermined wavelength. The interferometric signal produced by the interferometric sensor at the second predetermined wavelength is also bandpass filtered to pass the second amplitude response of an interferometric signal produced by the interferometric sensor at the second predetermined wavelength.

Example interferometric sensors include a Fabry-Perot sensor, an Extrinsic Fabry-Perot Interferometer (EFPI) sensor, a Mach-Zender sensor, or a Michelson sensor.

Other example embodiments apply the methods and apparatus to multiple interferometric sensors.

In example implementations, a first light source may provide light at the first predetermined wavelength, and a second different light source may provide light at the second predetermined wavelength.

In example implementations, the first operational mode is returned to from the second operational mode to determine an absolute measurement reference to be used in a subsequent return to the second operational mode.

In example applications, the current sensor measurand may be displayed and/or the current absolute optical path length that equates to a current sensor measurand value or from which a current sensor measurand value is determined may be transmitted to another device.

DETAILED DESCRIPTION

Figure 1:
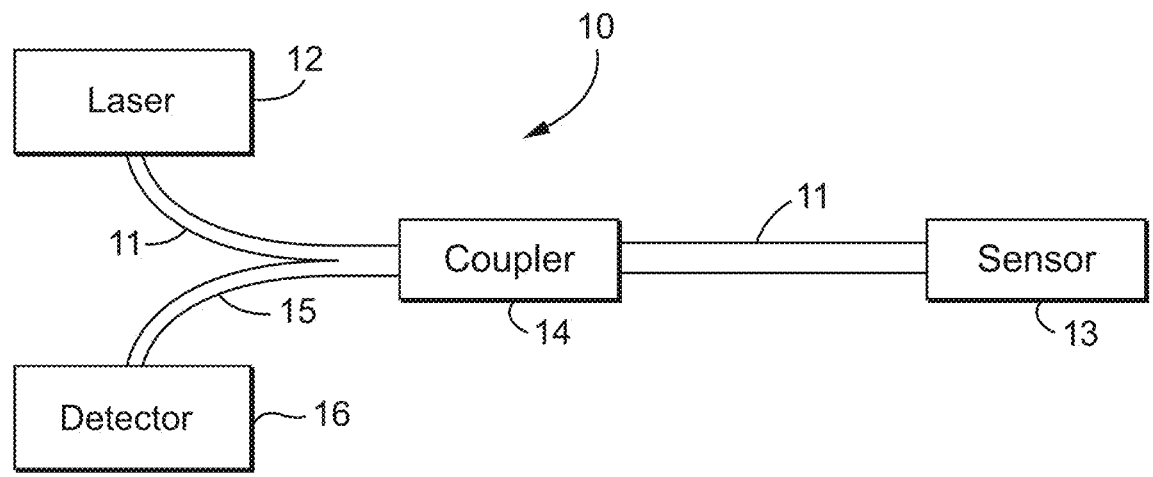
FIG. 1 shows a schematic block diagram of a interferometric sensor readout system arrangement.

The following description sets forth specific details, such as particular embodiments for purposes of explanation and not limitation. It will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as, for example, solid-state memory, magnetic disk, optical disk, etc containing an appropriate set of computer instructions that may be executed by a processor to carry out the techniques described herein.

The term "electrical signal" is used herein to encompass any signal that transfers information from one position or region to another in an electrical, electronic, electromagnetic, optical, or magnetic form. Electrical signals may be conducted from one position or region to another by electrical, optical, or magnetic conductors including via waveguides, but the broad scope of electrical signals also includes light and other electromagnetic forms of signals (e.g., infrared, radio, etc.) and other signals transferred through nonconductive regions due to electrical, electronic, electromagnetic, or magnetic effects, e.g., wirelessly. In general, the broad category of electrical signals includes both analog and digital signals and both wired and wireless mediums. An analog electrical signal includes information in the form of a continuously variable physical quantity, such as voltage; a digital electrical signal, in contrast, includes information in the form of discrete values of a physical characteristic, which could also be, for example, voltage.

Unless the context indicates otherwise, the terms "circuitry" and "circuit" refer to structures in which one or more electronic components have sufficient electrical connections to operate together or in a related manner. In some instances, an item of circuitry can include more than one circuit. A "processor" is a collection of electrical circuits that may be termed as a processing circuit or processing circuitry and may sometimes include hardware and software components. In this context, software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Hardware implementations of certain aspects may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Circuitry can be described structurally based on its configured operation or other characteristics. For example, circuitry that is configured to perform control operations is sometimes referred to herein as control circuitry and circuitry that is configured to perform processing operations is sometimes referred to herein as processing circuitry.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

Optical path length is the product of the geometric length of the path that light follows through a system and the index of refraction of the medium through which it propagates. A difference in optical path length between two light paths is often called the optical path difference (OPD). Optical path length is important because it determines the phase of the light and governs interference and diffraction of light as it propagates. More specifically, if a light wave is traveling through several different media, then the optical path length of each medium can be added to find the total optical path length. The optical path difference between the paths taken by two optical waves of the same frequency can then be used to find the phase difference that determines how the two waves will interfere. Typically, absolute optical path length measurements may be used to measure or sense small displacements, but larger displacements may also be measured.

An interferometric sensor has an optical path length that varies depending on one or more physical parameters to be measured using the interferometric sensor. Non-limiting examples of an interferometric sensor include a Fabry-Perot sensor, an Extrinsic Fabry-Perot Interferometer (EFPI), such as the example shown in FIG. 2, a Mach-Zender sensor, or a Michelson sensor. For ease of description, an EFPI sensor is used in the description below. However, the technology may be used with other suitable interferometric sensors.

The optical path length associated with the interferometric sensor gap can be determined based on measured detector amplitude responses. A measurement associated with the one or more physical parameters (e.g., strain, displacement, pressure, temperature, etc.) is then provided based on the determined optical path length.

Figure 4:
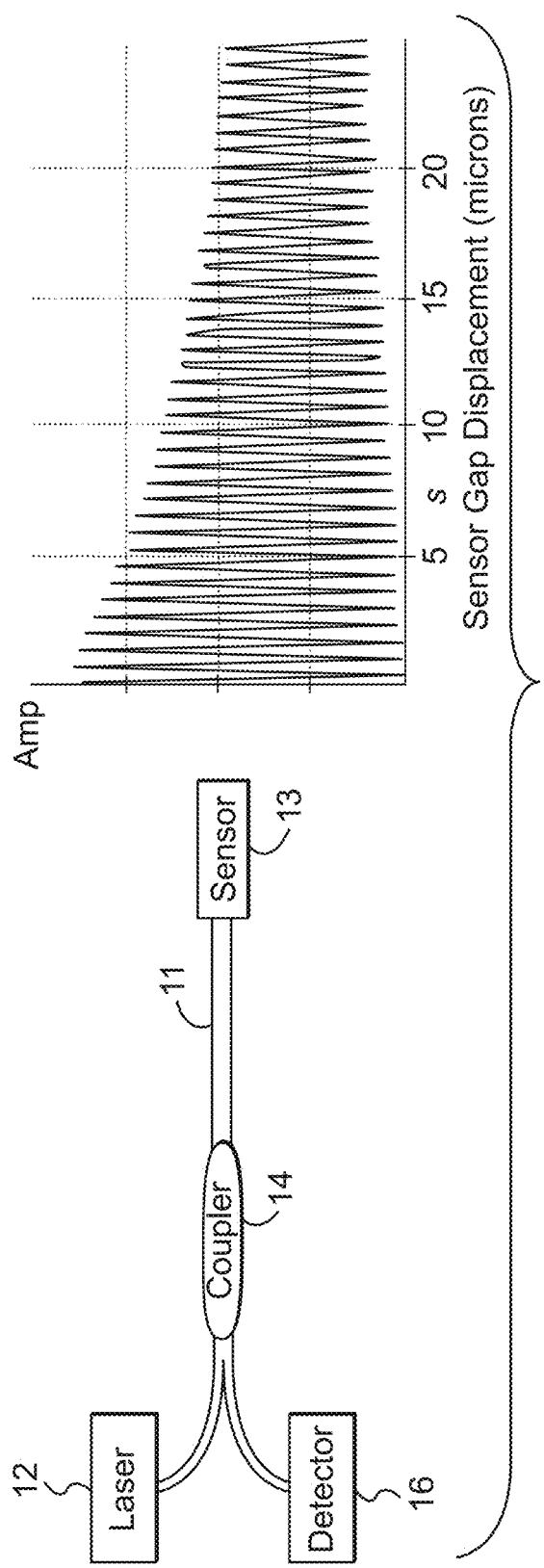
FIG. 4 shows detector electrical amplitude output as a function of sensor gap displacement for a narrow wavelength optical source used in the readout system depicted in FIG. 1.
Figure 5:
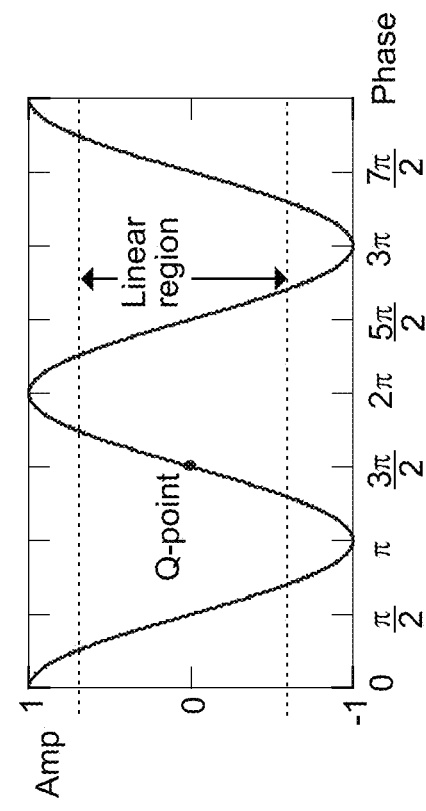
FIG. 5 magnifies a portion of the sinusoidal output from FIG. 4 with the interferometer phase change mapped to sensor gap displacement, with a π phase change being equivalent to a gap change of ¼ of a wavelength.

FIG. 4 graphs the single detected output of a single wavelength sensor system shown conceptually as a sinusoidal transfer function. As the gap increases, the detected light intensity or amplitude varies. Disadvantages of a single wavelength approach include a non-linear transfer function and directional ambiguity of the sinusoidal output. As shown in the graph in FIG. 5, if the sensor gap (½ the Optical Path Length, OPL) changes by a small amount when the initial interferometer phase is a multiple of $\pi$ (at a peak or valley in the sinusoid), then that change in detector amplitude may not be detected because the slope of the transfer function is small near those points. Additionally, if the detector amplitude is near a peak or valley, further amplitude change from those points may be due either to a decreasing or increasing sensor gap, so there is ambiguity in the direction of sensor gap change. Also, a single wavelength sensor system only detects changes from an unknown starting sensor gap, and accordingly, only provides relative measurements of gap length. No absolute measurement of gap length is provided.

Figure 6:
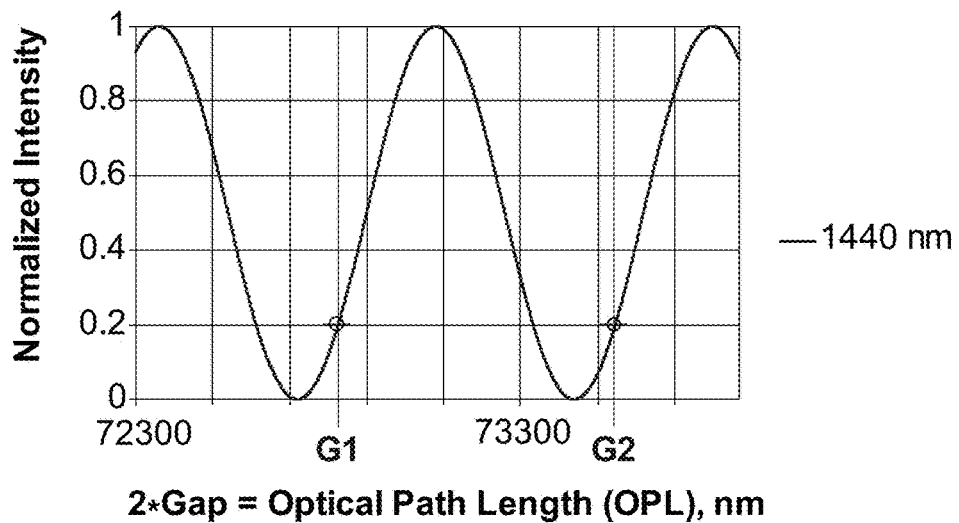
FIG. 6 is a graph illustrating directional ambiguity in the single wavelength system detected output shown in FIG. 4.

The graph in FIG. 6 illustrates an example of ambiguity in the absolute gap length. A normalized detected interferometric intensity for a single wavelength (1440 nm) is exactly the same (0.2) for two different gaps lengths G1 and G2 which correspond to two different optical path lengths. As explained above, the optical path length (OPL) of the sensor 13 is proportional to the length of the gap 24 multiplied by the index of refraction for the gap material. When the gap is an air gap, the index of fraction is 1.0, and the optical path length is twice the length of the gap length. So the two different gaps G1 and G2 as well as their respective different OPLs are indistinguishable. Another drawback of a single wavelength approach is that detector amplitude may vary for reasons other than changes to the sensor gap length, including variations in optical attenuation of the optical components and variations in the detector signal response gain, etc.

In short, although single wavelength systems can be made inexpensively, they are linear over only a short range, can generate multiple different OPLs for the same intensity, cannot separate intensity variations due to imperfections in the system optics and electronics vs. sensor changes, and provide only relative measurements. Relative measurement systems need a known starting condition for the sensor and must make measurements faster than the sensor's physical response to be able to track changes from the starting optical path length.

Figure 7:
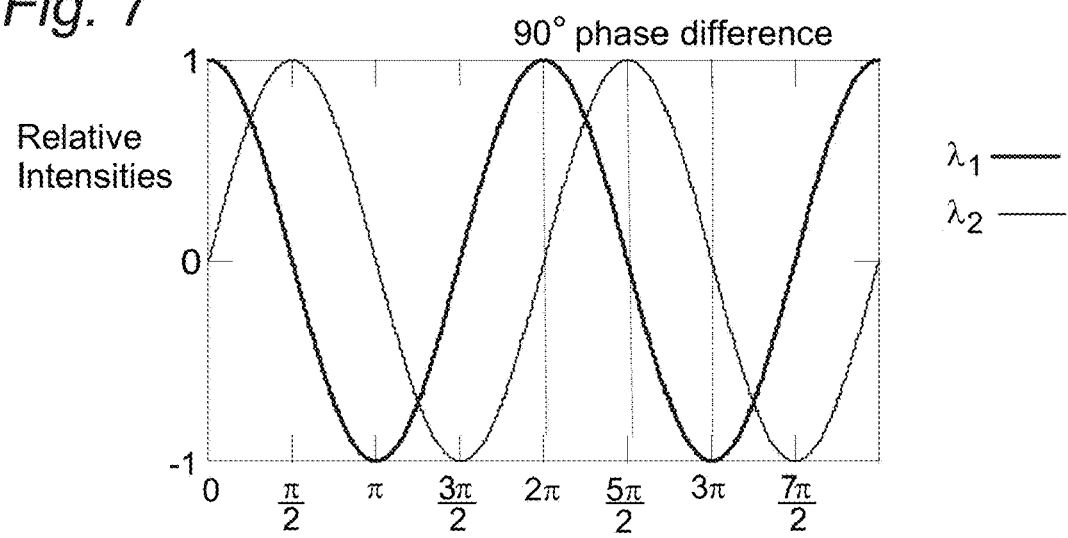
FIG. 7 graphs the detector amplitude for a narrow laser source as a function of sensor gap displacement at two wavelengths chosen to sample the interferometer fringe phase at 90 degrees apart.
Figure 8:
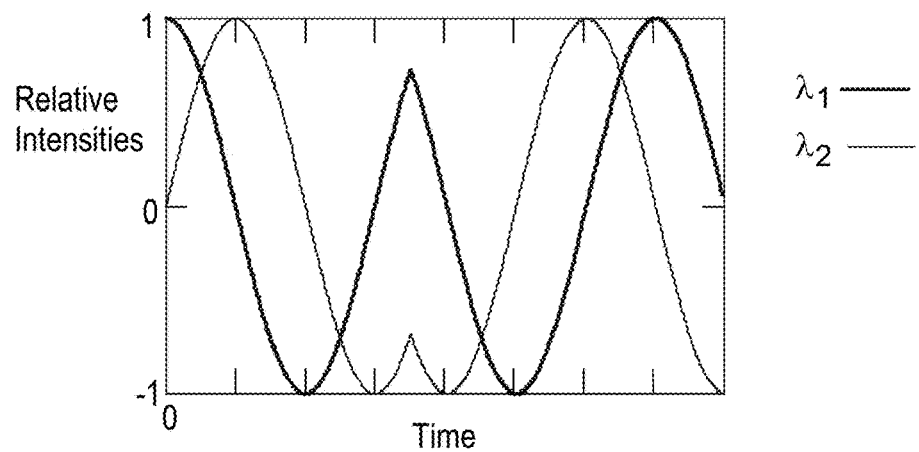
FIG. 8 is a graph illustrating the phase lead/lag relationship for two wavelengths at quadrature phase if the rate of change of the sensor gap flips sign.

A two wavelength demodulation system having two quadrature optic channels may be used to provide unambiguous gap length change measurements. The output wavelengths $\lambda_1$, $\lambda_2$ of two lasers are selected to generate quadrature, phase-shifted signals for a given sensor air gap. Quadrature signals are ninety degrees out of phase. Consequently, when one of the quadrature signals is at a peak or valley, the other quadrature signal is in the linear region as shown in FIG. 7. An output showing the phase lead/lag relationship at a change in the sign (or direction) of the rate of change of the sensor gap length, or turnaround, is shown in FIG. 8. Interferometer phase can unambiguously be determined by calculating the arctangent of the quadrature signals. Further, the phase shift between signals need not be exactly 90 degrees to unambiguously determine the interferometer phase if the phase offset is known and it is not an integer multiple of 180 degrees. Although the dual wavelength demodulation system provides a larger linear range, it still suffers from a drawback noted above for the single wavelength demodulation system: that gap length measurements are relative, i.e., not absolute.

The inventors developed an interferometric sensing system that achieves highly accurate absolute sensor measurements while also producing rapid relative sensor measurements. Example embodiments use a fixed-wavelength source and a tunable wavelength source and employs two operating modes: (1) a low-speed, swept wavelength mode that provides absolute spectral measurements from an interferometric sensor, and (2) a high-speed, quadrature-locked fixed wavelength mode that provides high-speed relative measurements from the interferometric sensor. Using the two modes allows the system to make high-speed relative measurements which are referenced, e.g., periodically, against an absolute measurement. The system provides high-speed sensor interrogation that can also mitigate and/or recover from errors associated with simpler amplitude-based interrogation schemes. Example embodiments use a tunable laser as a quadrature-locked source to further increase the range and robustness of the high-speed interferometric sensing technology.

In an example embodiments of the swept interrogation mode of operation, a tunable laser is swept across a range of different optical frequencies in order to make an absolute, low-speed (low bandwidth) measurement. Light reflected from the sensor is collected and converted from the time domain to the optical frequency domain based on the known rate of the laser sweep. This sweep produces a "picture" of the sensor's wavelength dependent reflection spectrum that is then converted to a measurement of sensor interferometer optical path length by evaluating the optical frequencies at which the interference pattern peaks and troughs exist. Because the laser sweeps across multiple interference fringes, it produces enough data to create an absolute interference length measurement. Since the laser sweep takes time, e.g., on the order of 10 ms using one example tunable laser, the low-speed, swept wavelength mode is used initially and then intermittently, e.g., periodically, when needed to reset the absolute interference length measurement reference.

After completing a sweep, the system leaves the low-speed, swept wavelength mode and switches to the high-speed, quadrature-locked fixed wavelength mode. To produce a high-speed measurement, a fixed wavelength $\lambda_1$ is generated, and the tunable laser 22 is set to a quadrature wavelength $\lambda_2$ (i.e., $\lambda_2$ is out of phase with $\lambda_1$ by 90 degrees) in the sensor's interference pattern selected using information from the previous full-spectrum laser sweep. The quadrature wavelength $\lambda_2$ is determined analytically, e.g., using an algorithm implemented by one or more computers and/or other electronic processing circuitry, using physical equations/model of an EFPI sensor (set forth below) and the known wavelength $\lambda_1$ of the fixed wavelength source 20. The amplitude of this quadrature signal $\lambda_2$ is monitored along with the amplitude of the signal associated with $\lambda_1$ to produce a high-speed, dual-wavelength sensor interference length measurement.

This high-speed data is fed back to the tunable laser to keep the interrogator locked at the quadrature point of the sensor. Use of the laser's tuning mechanism to lock the interrogator in quadrature increases the useful range of the interferometric sensor and reduces the need to make frequent low-speed swept measurements in the low speed mode of operation.

In addition to selection of the initial quadrature point, the full-spectrum sweep data is also used to define the starting position that produces a relative interferometric sensor measurement that is referenced against the absolute interferometric sensor measurement.

To perform a referencing step where an absolute interference fringe phase reference is determined, the system switches out of the high-speed quadrature-locked mode and back into the low speed, swept wavelength mode to perform another laser sweep, e.g., at predetermined intervals or on demand. The timing of this referencing step may be based on an observed rate of the change of the OPL measurements which is directly proportional to the external stimuli of the sensor to select a time when the sensor's interference length is not rapidly changing. Each time the system makes a wavelength sweep, the resulting absolute measurement data is used to (a) reset the initial quadrature point for the high-speed measurement mode, and (b) provide an absolute interference fringe phase reference for subsequent dual-wavelength (quadrature-locked) measurements.

Figure 9:
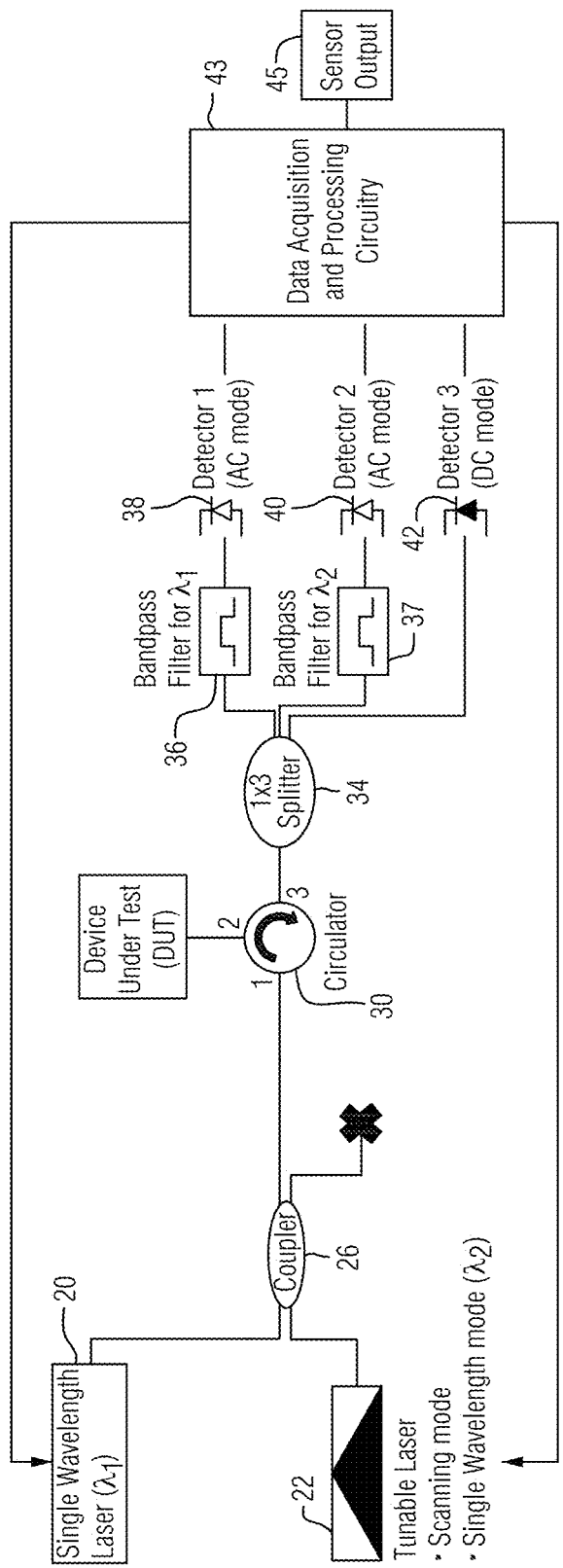
FIG. 9 is a diagram illustrating a non-limiting example of a multi-wavelength, multi-operational mode interferometric sensing system for obtaining during low speed mode accurate absolute sensor measurements and during high speed mode relative sensor measurements.

An example embodiment of the multi-mode interrogation system is now described in conjunction with FIG. 9 for an example single sensor/channel case. The sensor 32 is shown as a device under test (DUT) in the figure. A first laser 20 generates light a single wavelength $\lambda_1$, and a second tunable laser 22 generates a swept range of wavelengths in the low speed mode and at a wavelength $\lambda_2$ in the high speed mode of operation. The data acquisition and processing circuitry 43 controls the mode of operation and the outputs from the lasers 20 and 22. The tunable laser 22 has a known wavelength profile as a function of time for each sweep. During the high speed mode, an output the laser 20 at wavelength $\lambda_1$ combined with the tunable laser's single wavelength output $\lambda_2$ using a 2×2 coupler 26 and routed to the sensor via an optical circulator 30. Light reflected from the sensor 32 travels back to the circulator 30 and is routed to a 1×3 optical splitter 34. The splitter 34 divides the spectral content of the light equally between three output channels each having a respective photodiode light detector 38, 40, and 42. The light incident on detector 42 is evaluated in the data acquisition and processing circuitry 43 during the low speed, swept mode, (sometimes referred to below as a DC mode). While the tunable laser 22 is sweeping in the low speed mode, the single wavelength laser 20 is deactivated or shuttered either manually or automatically by the data acquisition and processing circuitry 43. The light incident on detectors 38 and 40 is provided for analysis by the data acquisition and processing circuitry 43 during the high speed, quadrature mode (sometimes referred to as an AC mode), during which time the data acquisition and processing circuitry 43 operates the tunable laser 22 to generate a fixed-wavelength $\lambda_2$ and the fixed wavelength laser 20 to generate the fixed-wavelength $\lambda_1$. Alternatively, a tunable laser may be used to generate the fixed-wavelength $\lambda_1$. Although two fixed wavelengths are described here, three or more fixed wavelengths may also be used. Bandpass filters 36 and 38 between the splitter 34 and the detectors 38 and 40 ensure that the sensor return signals associated with each of the lasers is passed through to its corresponding detector. Alternatively, a multiplexing technique may be used rather than filtering. For example, the two different wavelength signals may be time multiplexed. Alternatively, a high speed modulation may be applied to each wavelength signal and then they are processed using frequency multiplexing. The data acquisition and processing circuitry 43 processes the detected intensities in accordance with suitable interferometric analysis and processing algorithms (examples of which are explained below), and preferably provides a sensor output to a display, a storage device, a computing device, etc. The sensor output may include the optical path length or an engineering unit such as strain, pressure, temperature, etc.

Figure 10:
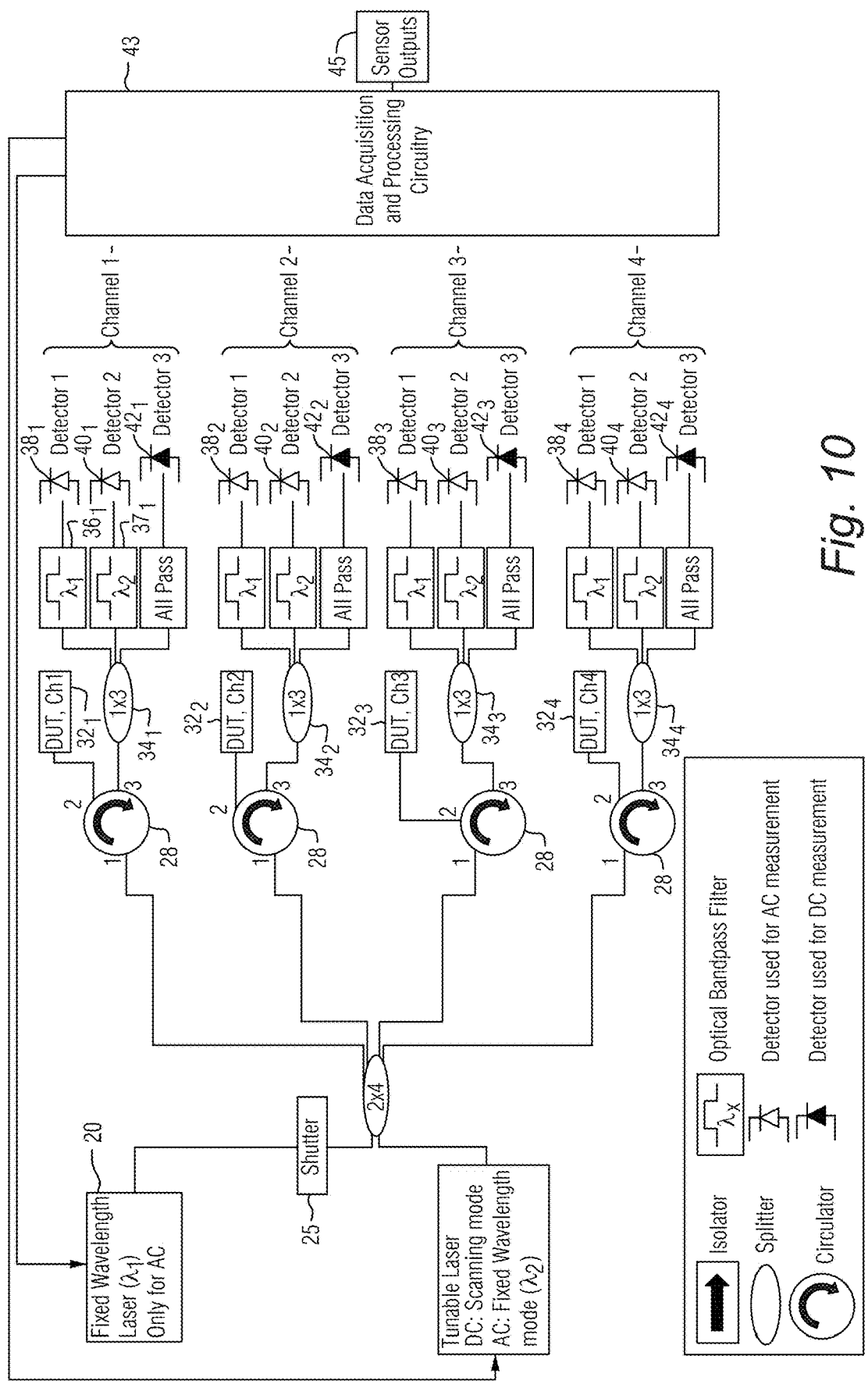
FIG. 10 is a diagram illustrating a non-limiting example of a multi-wavelength, multi-operational mode interferometric sensing system for obtaining during low speed mode accurate absolute sensor measurements and during high speed mode relative sensor measurements for multiple interferometric sensors.

The system shown in FIG. 9 for one sensor/channel may be expanded to accommodate multiple sensors and channels. An example system for four sensors 341-344 is shown in FIG. 10. Similar reference numbers are used with subscripts 1-4 being used identify one of the four sensors/channels. Because the output of both lasers 20 and 22 is shared among the four channels, the expansion of the system does not incur additional cost associated with additional lasers. Each of the four channels is similar to the single channel case shown in FIG. 9 and uses filters and detectors so that each channel may be interrogated simultaneously.

Figure 2:
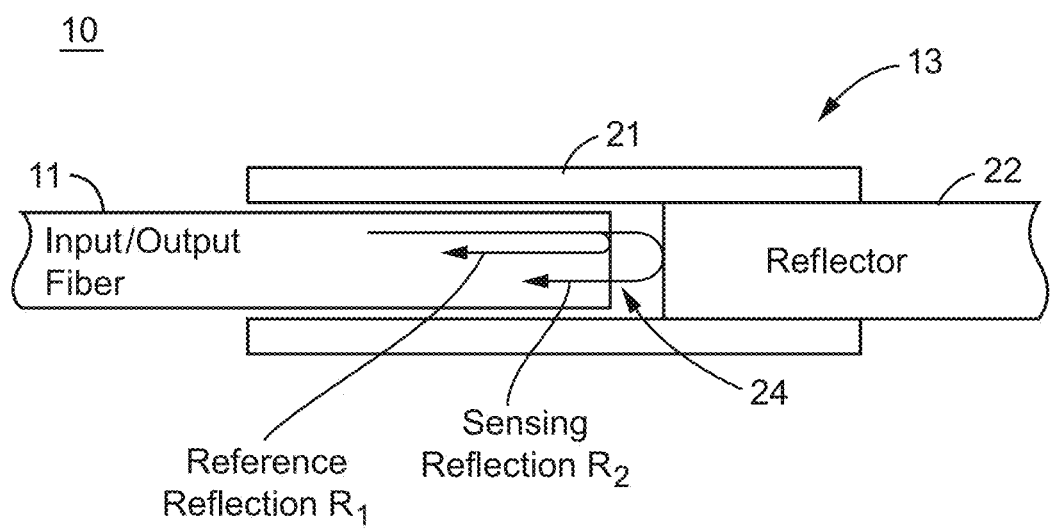
FIG. 2 shows an example construction of an EFPI type interferometric sensor useable for example as a strain gauge.
Figure 3A:
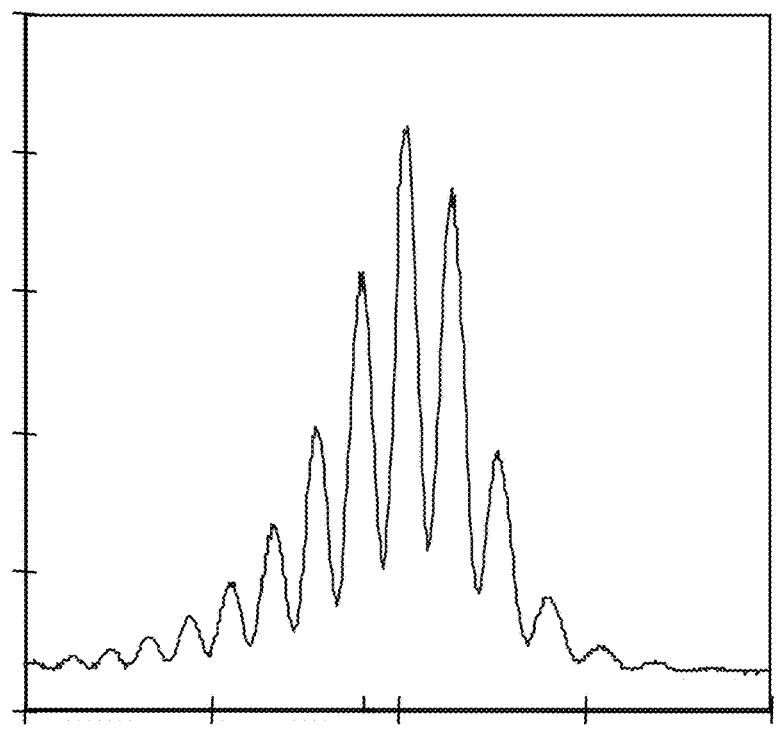
FIGS. 3A and 3B are intensity v. optical frequency patterns for different gap lengths of the EFPI sensor example shown in FIG. 2.
Figure 3B:
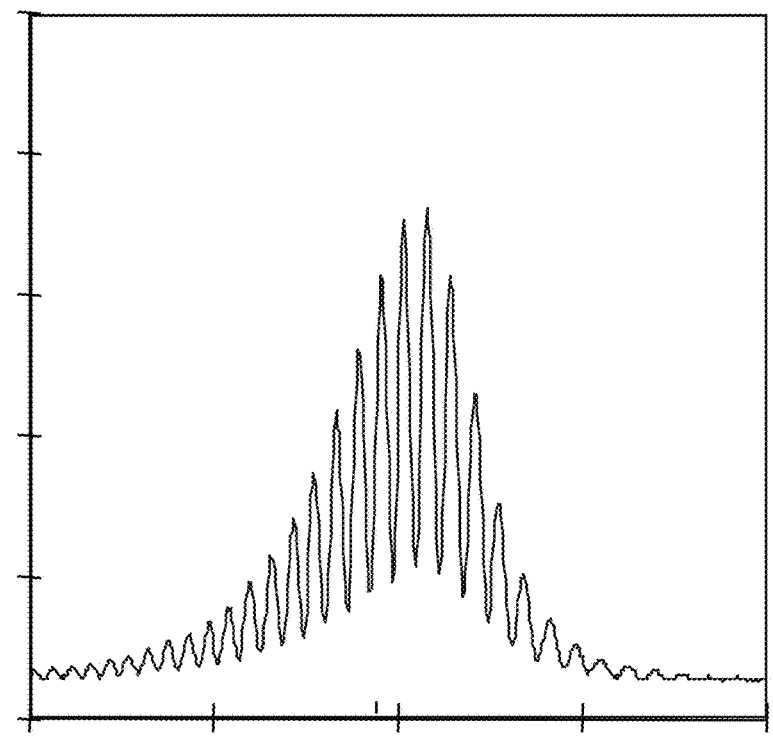

Specific example details of interferometric analysis and processing as performed by the data acquisition and processing circuitry 43 for an EFPI sensor like the one shown in FIG. 2 are now described in detail. The intensity, I, of the return signal reflected from the interferometric sensor may be expressed as Equation (1) when the reflected signal from the interferometric sensor can be modeled as a 2-beam interferometer (in this case, a very low finesse Fabry-Perot cavity). This interference pattern is a function of a series (n=1, 2, . . . N) of wavenumbers, $k_n$, $$I(k_n)=AI_o(k_n)+BI_o(k_n)\cos(k_nL+\phi(k_n,L))+v(k_n) \quad (1)$$

where $I_o(k_n)$ is the source light spectrum, $v(k_n)$ is noise in the measurement, $AI_o(k_n)$ is the background source spectrum, $BI_o(k_n)$ is the amplitude modulation on the cosine function, $\phi$ is a wavelength-independent phase term acquired as the signal travels in the interferometer sensor cavity, and L=2d, where d is the geometrical distance between the two reflectors (the gap distance) and L is the optical path length. Calculating optical path length L requires determining the argument of the cosine term, and this requires both an accurate mathematical model of the argument and sufficient measurement data. The more interference fringes the sensor return signal contains, the more accurate the calculation of optical path length L. More interference fringes are generated when the illuminating source possesses a wider wavelength range ($\Delta\lambda$). The number of fringes, m, also increases with an increasing gap length according to the formula:

$$m = \frac{\Delta\lambda}{\lambda_1\lambda_2}L. \quad (2)$$

When a broadband source is used, the signal returned by the interferometric sensor is processed using a high resolution spectrum analyzer to determine the intensity at each wavelength. As the intensity features a sinusoidal modulation, it is commonly referred to as a fringe pattern. A more effective option for certain wavelength ranges is to use a tunable laser which quickly sweeps over a set wavelength range. As the laser sweeps, intensity data is collected as a function of time. As time, in the case of a swept laser, relates directly to the laser wavelength, this intensity versus time data provides the same fringe pattern for analysis as does the output of the spectrum analyzer in the case of a broadband source.

Figure 11:
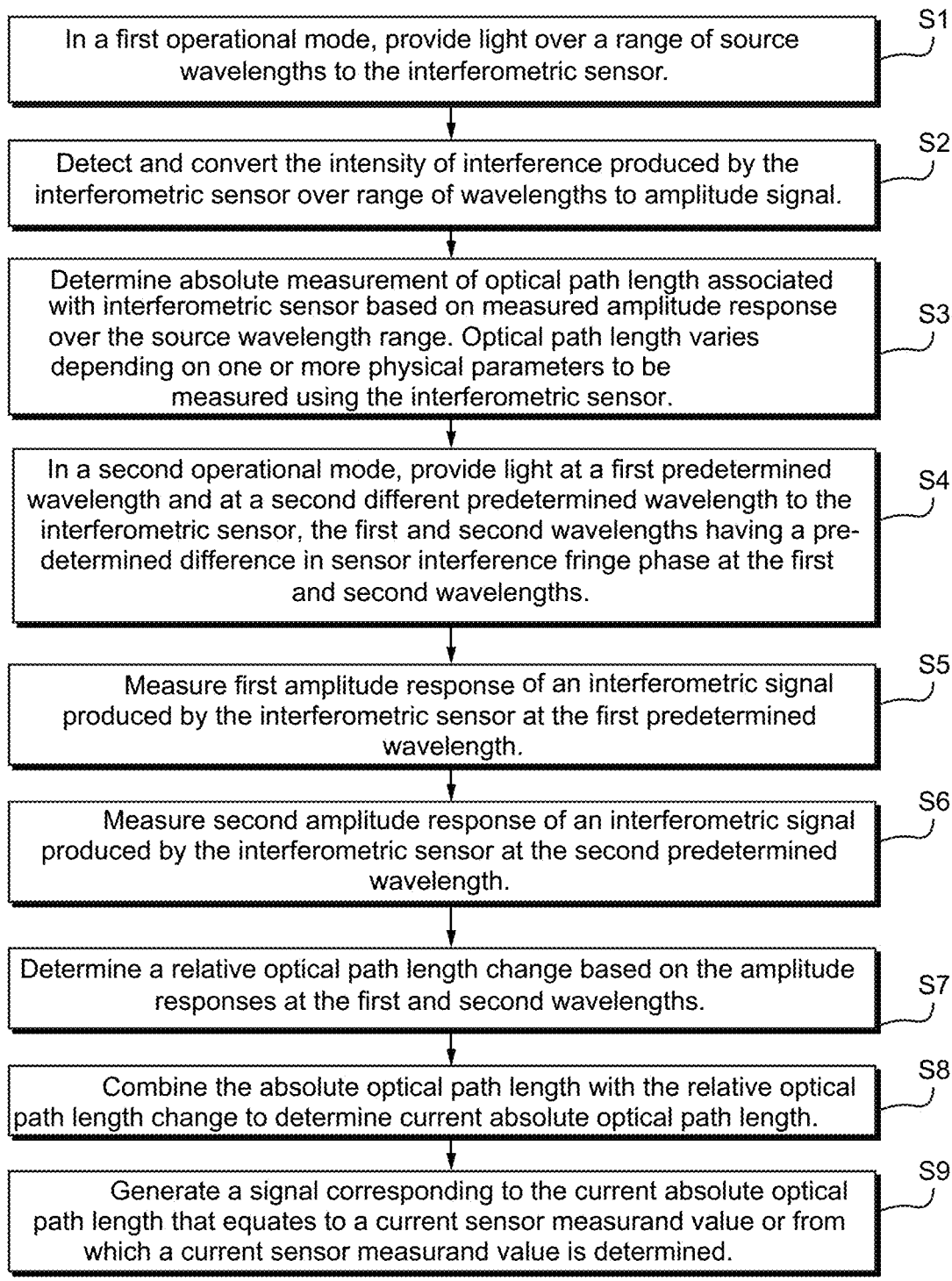
FIG. 11 is a flow chart diagram illustrating example interrogation algorithm steps for implementing a multi-wavelength, multi-operational mode interferometric sensing in accordance with example embodiments.

A flowchart that sets forth an example algorithm for interferometric sensor interrogation using a system such as the examples shown in FIGS. 9 and/or 10 based on equation (1) is shown in FIG. 11 and now described. In a first operational mode, light is generated at different scanned wavelengths over a range of wavelengths and provided to the interferometric sensor (step S1). An amplitude response of an interferometric signal produced by the interferometric sensor is measured over the range of scanned wavelengths (step S2). An absolute measurement of an optical path length associated with the interferometric sensor is determined at each of the scanned wavelengths based on the measured amplitude response at each of the scanned wavelengths (step S3). The optical path length varies depending on one or more physical parameters to be measured using the interferometric sensor. In a second operational mode, light at a first predetermined wavelength $\lambda_1$ and at a second different predetermined wavelength $\lambda_2$ is provided to the interferometric sensor (step S4). The first and second wavelengths are chosen such that there is a predetermined difference in the sensor interference fringe phase at the first and second wavelengths. A first amplitude response of an interferometric signal produced by the interferometric sensor at the first predetermined wavelength $\lambda_1$ is measured (step S5). A second amplitude response of an interferometric signal produced by the interferometric sensor at the second predetermined wavelength $\lambda_2$ is measured (step S6). A relative optical path length change is determined based on the amplitude responses at the first and second wavelengths (step S7). The absolute optical path length is combined with the relative optical path length change to determine current absolute optical path length (step S8). A signal corresponding to the current absolute optical path length is generated that equates to a current sensor measurand value or from which a current sensor measurand value is determined (step S9).

In a non-limiting example implementation, a Phoenix 1200 scanning laser (produced and sold by Luna Innovations, Inc.) was used that is capable of sweeping at rates greater than 5000 nm/s over a 40 nm range in the wavelength range centered at 1540 nm. For the case of a 40 nm scan range, minimum and maximum wavelengths 1520 nm and 1560 nm, and an arbitrary distance (d) between the input/output fiber and the reflective target of 250 microns (which corresponds to a 500 micron total travel distance (L)), slightly over 8 fringes were produced. This is sufficient for the absolute portion of the example algorithm shown in FIG. 11 and described above.

Figure 12:
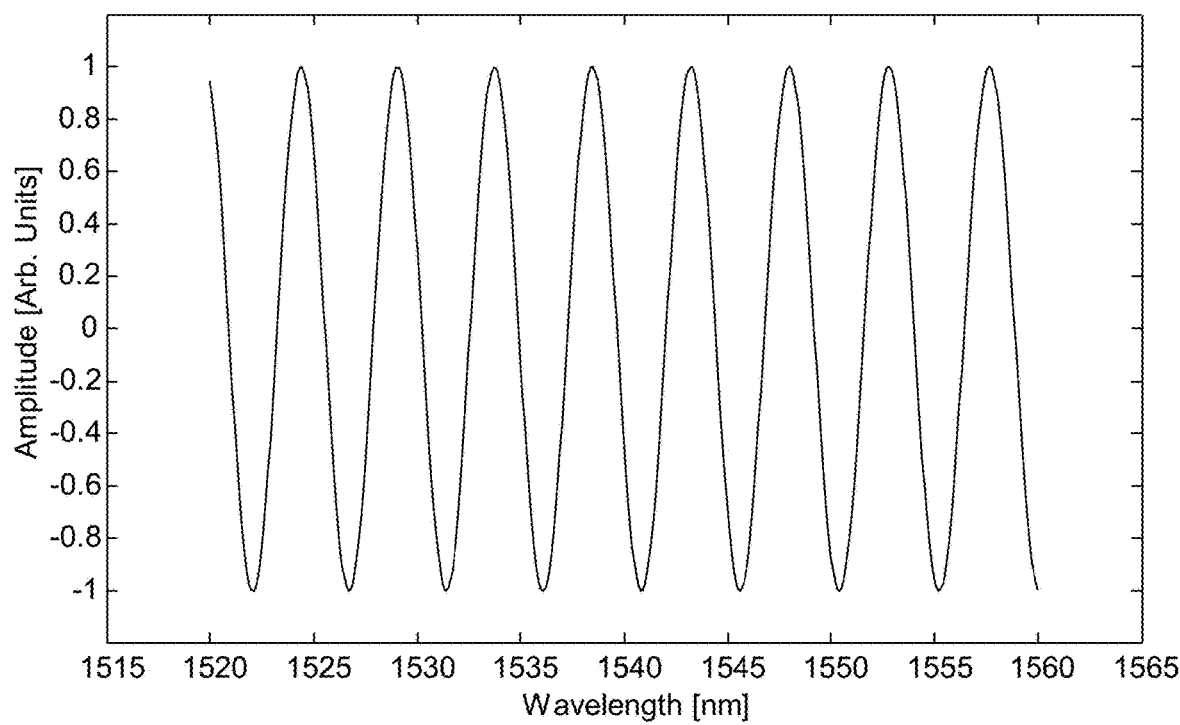
FIG. 12 is a graph showing an example interference fringe pattern associated with an example EFPI sensor using a tunable laser swept over a range of optical frequencies/wavelengths.

FIG. 12 shows the fringe pattern obtained for an EFPI sensor scanned using the Phoenix scanning laser at a constant output power. (See S1 and S2 in FIG. 11). The absolute measurement of OPL can be determined from the frequency of this detected fringe pattern. (See S3 in FIG. 11).

A Fourier transform method and a least squares sine fit method applied to the detected intensity data represented in FIG. 12 may be used to determine an absolute optical path length value L as a reference to maximize the accuracy of the low speed mode interferometric sensor measurements. These methods theoretically produce results of equal accuracy when certain conditions are met, but one or the other may produce better results in less time depending on actual conditions. In an example implementation, the Fourier transform method is used to obtain a good estimate L, which is then used as a seed value for the sine fit method. The accuracy of L calculated by the sine fit method improves with better seed values. (This may be implemented, e.g., at S3 FIG. 11).

The Fourier transform method has several challenges. One challenge is a toggle, or jump, on the order of half of the center wavelength of the optical source used. The jump is a result of accumulated error in the algorithm with respect to identifying the maximum peak location when taking a fast Fourier transform (FFT) of the fringe pattern.

The Fourier transform method decomposes the signal into frequency (or in the case of this analysis, from the optical frequency domain to time-of-flight delay domain which can be scaled to optical path length) components. By virtue of the cosine term in Equation (2), one of those frequency components occurs at frequency (delay) +L and another at −L. The first term of Equation (2) is transformed to a frequency component that coincides with the delay origin. The value of L is determined by finding the delay position of the peak amplitude of that component. Aliasing effects can create error in the results, but the signal can be lowpass-filtered to mitigate this. Windowing, which is a part of the process of transforming the signal into the delay domain, also contributes error; it causes spectral leakage which can perturb the contents of nearby frequency bins. Fourier analysis provides direct information about the frequency content at a number of discrete frequencies (delays); however, the frequency of interest may fall in between these frequency points. In that case, interpolation, performed by zero-padding the spectral domain signal before taking the Fourier transform, combined with peak fitting techniques can be used to estimate the frequency (delay) of the peak.

Implementing the Fourier transform method begins with windowing the spectral domain interferometric sensor data using a Hamming window or other appropriate window. These data may then preferably be zero padded, e.g., on the order of $2^{12}$-$2^{16}$, resulting in interpolation in the frequency (delay) domain representation of the signal. Interpolation aids in identifying the frequency (and the associated optical path length L) at which the maximum of the peak of interest occurs. After transforming the zero padded spectral signal into the frequency (delay) domain, the frequency of the peak may be roughly identified by searching for maximum intensity values around the expected frequency (delay). The actual frequency of the peak, L, may then be more accurately estimated by applying a peak-finding technique, such as parabolic interpolation, to the interpolated data.

The least squares sine fit method analyzes the detected signal in the optical frequency domain. The detected sensor intensity signal is assumed to have the form of Equation (1), and the parameters needed to fit the function generated by Equation (1) to the detected signal as evaluated by the residuals of a least squares fit are determined through an iterative process. One of the fit parameters is L, and L is determined in the process of calculating the fit. Accurate and rapid results may be achieved using reasonable initial estimates for the unknown parameters (frequency L, offset A, amplitude B, and phase $\phi$) in Equation (1). Errors in these initial estimates and noise correlated with the input, which can result from an imperfect sensor, can bias the result. Least squares analysis works well when the form of the input signal is well known, and when the system of interest is well understood and accurately modeled. The least squares method can also fit a variety of non-linear models and performs well in detecting the frequency response of a system, especially when the frequency of interest is known.

The least squares method prefers a good seed value for L, which is obtained by first processing the interferometric sensor return signal based on the Fourier transform method described previously. Depending on the quality of the raw signal detected, it may also be preferably to filter the signal.

The spectral domain representation of the signal, $$\overline{x}_n = \overline{A}_n \cos(k_n L + \phi(k_n, L)) + \overline{v}_n, \quad (3)$$

includes the amplitude, $\overline{A}_n$, the gap length L, the phase $\phi$, and the residual noise, $\overline{v}_n$, as the unknowns. By defining $\alpha = A \sin(\phi)$ and $\beta = A \cos(\phi)$, retaining the wavelength-dependent terms in the arguments, and taking the residual noise and wavelength-independent terms to be constant, C, Equation (3) can be expressed as $$y_n[\alpha,\beta,C,L] = \alpha \cos(k_n L + \phi(k_n, L)) + \beta \sin(k_n L + \phi(k_n, L)) + C \quad (4)$$

An iterative least squares estimate technique is used to determine L to within a desired accuracy without requiring values of parameters $\alpha$, $\beta$, and C to be determined for many applications. Equation (4) may be expressed as $$y = Dx \quad (5)$$

where the y values are the measured data, and $$x = (\alpha, \beta, C)^T. \quad (6)$$

The D matrix contains the parameter of interest, L $$D = \begin{bmatrix} \cos(k_1 L + \phi(k_{n1}, L)) & \sin(k_1 L + \phi(k_{n1}, L)) & 1 \\ \vdots & \vdots & \vdots \\ \cos(k_N L + \phi(k_N, L)) & \sin(k_N L + \phi(k_N, L)) & 1 \end{bmatrix} \quad (7)$$

A grid of $L_i$ (with i=1, 2, . . . , M), and with the seed value of L as the mean, is generated, and then the matrix $D_i$ is calculated for each $L_i$. Using that value of $D_i$, $$\hat{g}_i = y^T D (D^T D)^{-1} D^T y \quad (8)$$

is evaluated. The value of $L_i$ that corresponds to the maximum value of gi is the best estimate of L. This process is repeated to refine the estimate of the absolute measurement for L in the low-speed operational mode. (See S3 in FIG. 11).

Interrogating a low finesse Fabry-Perot cavity with a single wavelength source in the high speed operational mode returns a sensor intensity signal that can be expressed as:

$$I_r = |A_1 + A_2|^2 \approx A_1^2 + A_2^2 + 2A_1 A_2 \cos(kL + \phi(L,k)) \quad (9)$$

where $A_1$ and $A_2$ are the amplitudes of the signals reflected from the input/output fiber end face and the reflective target, respectively, $k = 2\pi/\lambda$ is the wave number, L is twice the separation between fiber and target, and $\phi$ is an additional phase difference acquired by the $A_2$ beam as it travels in the cavity. The gap length is determined by monitoring the intensity of the reflected beam and using that data to determine the phase of the cosine argument. (See S4 in FIG. 11). At a fringe maximum, $$L = \frac{\lambda}{2\pi} \phi(L, k) \quad (10)$$

Using a single wavelength interrogation approach and assuming a monotonously changing gap length, it is possible to determine the gap length, referenced to some DC baseline value, by monitoring the intensity signal and counting fringes. However, if the change in gap length switches from increasing to decreasing (or vice versa) at a fringe maximum or minimum, the reversal of direction cannot be detected. This single-wavelength approach can result in directional ambiguity which can have a substantial impact on the accuracy of the gap measurement. In addition, the sinusoidal function is nonlinear, and it offers a lesser sensitivity when the intensity pattern falls in the peak and valley regions than when it is centered on the linear portion of the curve. This can be seen in the example graph in FIG. 13.

Figure 13:
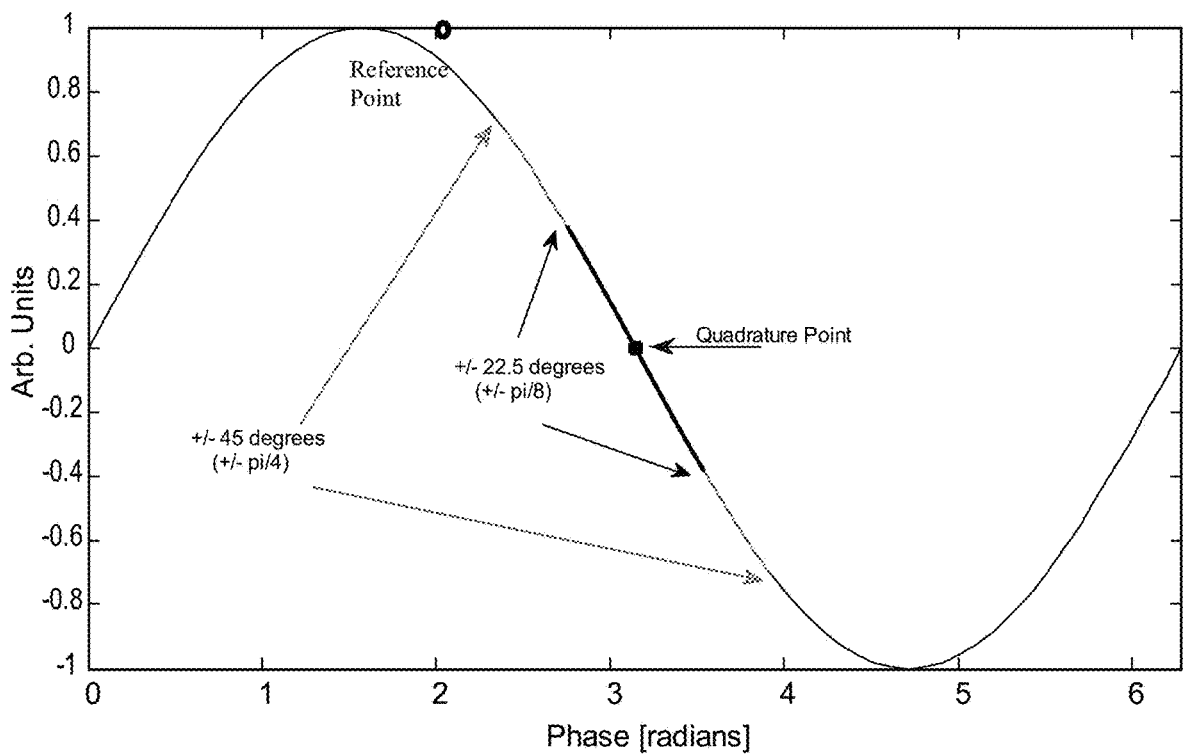
FIG. 13 is a graph showing a linear region around a quadrature point associated with operation of the tunable laser in the high speed mode of operation.

One example way to ensure that the direction of gap change is known and to make the resolution along the entire sinusoidal transform function more uniform is to use a 2-wavelength ($\lambda_1$, $\lambda_2$) interrogation approach corresponding to the above-described high-speed mode of operation. (See S5 and S6 in FIG. 11). This approach functions well when the return signals corresponding to the two wavelengths are in quadrature: when the sensor is illuminated by the second wavelength, the phase of the cosine term in Equation (11) is different by an odd multiple of $\pi/2$ than when it is illuminated by the first wavelength. Mathematically, this is expressed $$L\left(\frac{2\pi}{\lambda_2}\right) + \phi\left(L, \frac{2\pi}{\lambda_2}\right) - L\left(\frac{2\pi}{\lambda_1}\right) - \phi\left(L, \frac{2\pi}{\lambda_1}\right) = \frac{\pi}{2}(2m+1), \quad (11)$$

where m=1, 2, . . . and it can be seen from this equation that operation in quadrature depends not only on the interrogating wavelengths, but on the gap length as well. As shown in FIG. 13, the quadrature point need not be located on the same fringe as the reference point.

When the system is operated in quadrature, the gap separation may be obtained from the normalized amplitudes of the reflected signal intensities, $$\tilde{I}_1(k_1, L) = \cos(k_1 L + \phi(k_1, L)) \quad (12)$$

$$\tilde{I}_2(k_2, L) = \cos(k_2 L + \phi(k_2, L) + \phi_{12}(L)) \quad (13)$$
$$= \cos\left(k_1 L + \frac{\pi}{2} + \phi(k_1, L) + \phi_{12}(L)\right)$$
$$= \sin(k_1 L + \phi(k_1, L) + \phi_{12}(L)),$$

where $\phi_{12}$ is the gap-dependent phase deviation from quadrature. When $\phi_{12}$ is zero, $$k_1 L + \phi(k_1, L) = \operatorname{atan}\frac{\tilde{I}_2}{\tilde{I}_1} \pm m\pi, \quad (14)$$

and when $\phi_{12}$ is non-zero a correction derived from basic trigonometric identities will be used.

Example embodiments optimize this mathematical model used to describe the function of the return signal's intensity. An optimization process includes investigating whether the sensor return signal is more accurately modeled as Fabry-Perot cavity rather than a low finesse Fabry-Perot cavity. The above description involving equations 1-14 assumed a low finesse Fabry-Perot cavity, which is modeled by Equation (1). In contrast, the transfer function of a Fabry-Perot cavity is:

$$I_r(k_n, L) = \frac{1 - \cos(k_n L + \phi(k_n, L))}{1 + R^2 - 2R \cos(k_n L + \phi(k_N, L))} \quad (15)$$

where R is the power reflectivity of the optical interfaces. The denominator of Equation (15) is approximately equal to 1 in the case of a very low finesse Fabry-Perot cavity, which yields Equation (1).

Once the intensities are known (i.e., detected), they may be combined and used to determine the relative change in the OPL of the sensor (see S7 in FIG. 11) from the previous measurement.

By adding the relative OPL change of the first measurement in the second mode of operation to the absolute measurement determined (see S3 in FIG. 11), the absolute OPL is determined from the combination of the two modes. Building upon this for subsequent measurements (see S8 in FIG. 11), the absolute OPL may be tracked.

Knowledge of the absolute OPL enables a user to generate a signal that equates to the sensor's measurand through an appropriate conversion which may be obtained when the sensor was designed or calibrated (see S9 in FIG. 11).

Accordingly, the example sensor measurement and interrogation systems, such as the examples shown in FIGS. 9 and 10, combine two interrogation algorithm approaches where a tunable laser operates in a first low speed mode to produce an absolute measurement system to track the optical path length (which can be related to a desired sensor measurand) when it is changing slowly (which is why the label DC signal is used), and two fixed wavelength lasers operated in the high-speed, relative-measurement mode to make measurements when the signal is changing quickly (which is why the label AC signal is used). The relative measurements are made with respect to the last absolute measurement, and an absolute measurement may be made at any time to recalibrate the reference value.

Using a tunable laser 22 that scans over a desired wavelength range and that can also be operated at a fixed and user-specified wavelength $\lambda_2$ provides accuracy and flexibility. The quadrature condition depends on the gap width of the EFPI sensor. The ability to customize the tunable laser's fixed-wavelength emission means that the optical system can be optimized to be in quadrature for each EFPI sensor gap without having to replace optical network components such as the filters which prevent the fixed wavelength signal from interfering with the swept wavelength within the designed range. This also enables the data acquisition and electronic processing circuitry 43 to actively adjust the emission from the tunable laser 22 in order to remain in quadrature as the EFPI sensor's gap length increases or decreases.

Depending on the application, the combined absolute and relative sensor measurement technology may be limited by the speed of the data acquisition and electronic processing circuitry 43 used to process the signal. Faster processing may be more desirable in real time applications. The technology enables a low-speed sensor reading to be determined initially and then a dynamic, high-speed measurement to subsequently be tracked at very high data rates. While the high-speed measurement may be relative to the low-speed absolute measurement, it is possible to determine the absolute measurement value for the sensor by combining the low-speed and high-speed measurement values. Example embodiments support this flexibility to provide accurate data reduction with little or no jumps and/or ambiguities while calculating the relative measurement of the sensor.

The system was described above using an EFPI sensor. The system may also be used in other environments such as an environment that creates a Fabry-Perot cavity that can be manipulated accurately through mechanical means. This simulates the changes which would be seen with an applied stimuli. An EFPI sensor detects an external stimulus (i.e., pressure or temperature changes) by having a sensor material that responds to the stimulus as a change in the size of the Fabry-Perot cavity. As the measured parameter changes, the sensor material reduces or increases the size of the optical gap on the EFPI sensor. The interrogation light that traverses this air gap interferes with reference light within the sensor. By mechanically varying the size of an air gap, the effects of an external stimulus can be tested directly without having a test setup that requires extreme pressures or temperatures.

In one example experiment, one end of an optical fiber was connected to the data acquisition and electronic processing circuitry 43, and the other end was cleaved to be perpendicular to the long axis of the fiber. The cleaved end of the optical fiber was taped along a groove in a micrometer-positioned stage with the cleaved end face positioned in the gap between the two stages. A reflector fashioned from a short length of optical fiber with a cleaved end was taped along the groove in the piezo-driven stage so that the cleaved end face was also located in the gap between the two stages. The cleaved end faces of the one fiber end and the reflector were aligned such that light emitted from the one fiber end reflected off of the reflector and was collected by the one fiber end. Foam was placed under the base of the setup to effect vibration isolation. A box was placed over the setup during data acquisition to isolate the setup from air currents.

DC data were taken with the piezo-driven stage held in one position. DC data measurements include signal data acquired while the tunable laser scans over its full range. The resulting data, which includes signal intensity as a function of laser wavelength, are analyzed, and absolute values of the sensor width (the air gap) were calculated from them. The system was then transitioned to AC mode by opening the switch between the fixed wavelength laser (emission wavelength 1530 nm) and the optical network and locking the tunable laser wavelength at an emission wavelength in the vicinity of 1551 nm. The exact locked wavelength was chosen by analyzing the last set of DC data and determining what wavelength was required to place the fixed laser and the locked laser signals in quadrature with one another.

Figure 14:
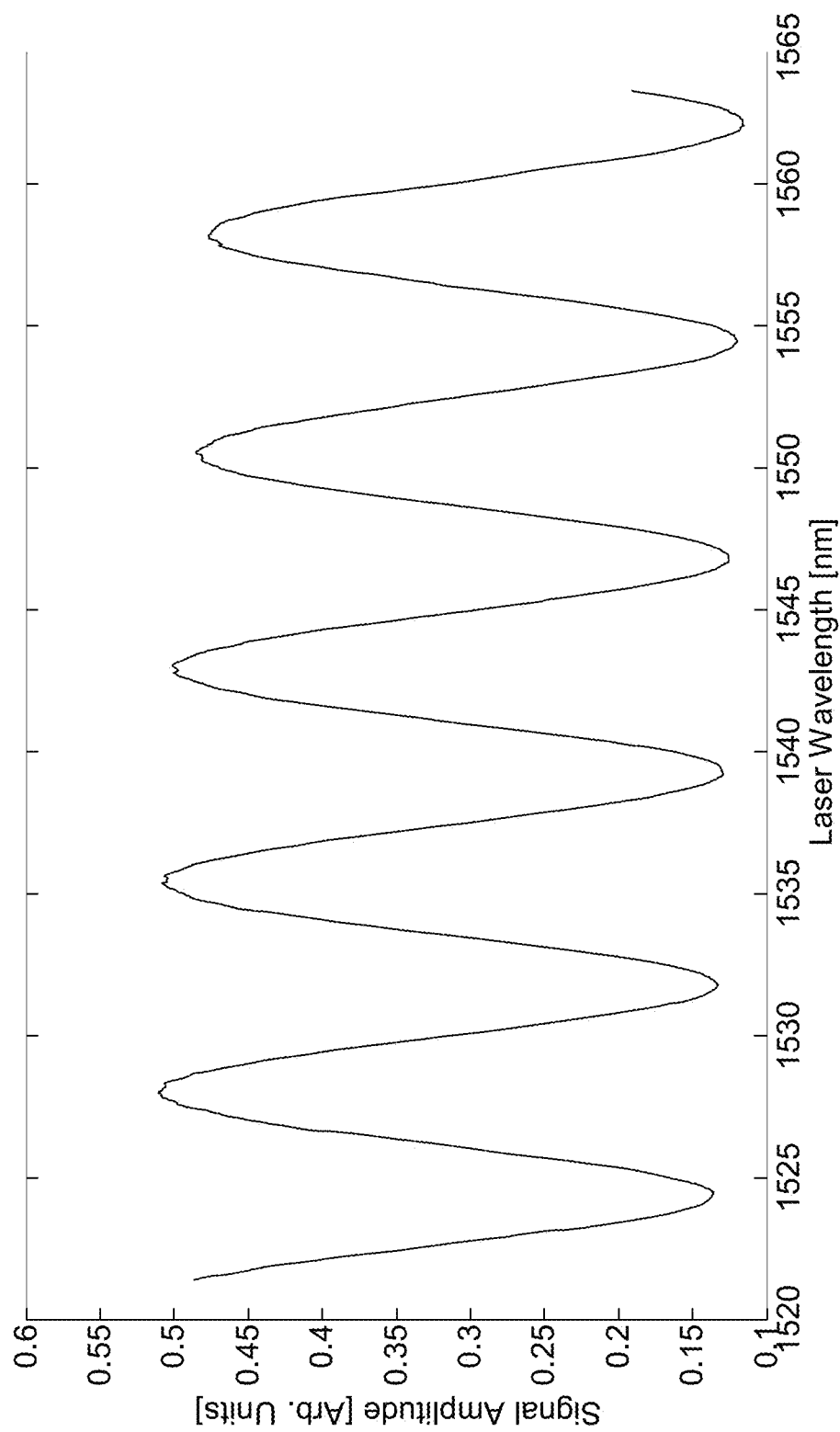
FIG. 14 is a graph showing an example of DC data (absolute amplitude measurement data) detected during the low speed wavelength scanning mode.

After transitioning the system to AC mode, AC data were taken while the piezo-driven stage reduced the gap by 5 microns and was held briefly at that new position. Thereafter, the gap was increased by 5 microns to return to the starting position. The rate of translation of the stage was 0.25 microns/s. The last DC signal acquired prior to transitioning to AC mode is shown in FIG. 14. Analysis of the fringes in FIG. 14 by the data acquisition and electronic processing circuitry 43 determined a sensor width of 157.873 microns.

Based on the sensor width and the wavelength of the fixed laser, the data acquisition and electronic processing circuitry 43 calculated that locking the tunable laser's wavelength at 1554.8128 nm would put the signals from the fixed-wavelength and the locked-wavelength lasers in quadrature with one another.

After transitioning to AC mode, the signals produced by both lasers were collected while the piezo-driven stage reduced the gap by 5 microns, held steady, and then increased the gap by 5 microns to return to its initial state. The signals generated during this procedure are shown in FIG. 15.

The AC data are analyzed by the data acquisition and electronic processing circuitry 43 as they are acquired to determine change in sensor width. The data acquisition and electronic processing circuitry 43 only has access to the most recently acquired pair of signal data (one point from the fixed-laser signal and one point from the locked-wavelength laser) and the previously-taken data. When the changes in the sensor width (calculated from the AC data) were added to the absolute value of the width (calculated from the DC mode), the values of sensor width during the piezo-driven stage experiment was determined. The starting gap was determined to be 157.876 microns, the gap after the −5 micron translation to be 152.862 microns, and the final gap to be 157.861 microns. The calculated sensor width data were consistent with the expected movement of the piezo-driven stage.

Figure 15:
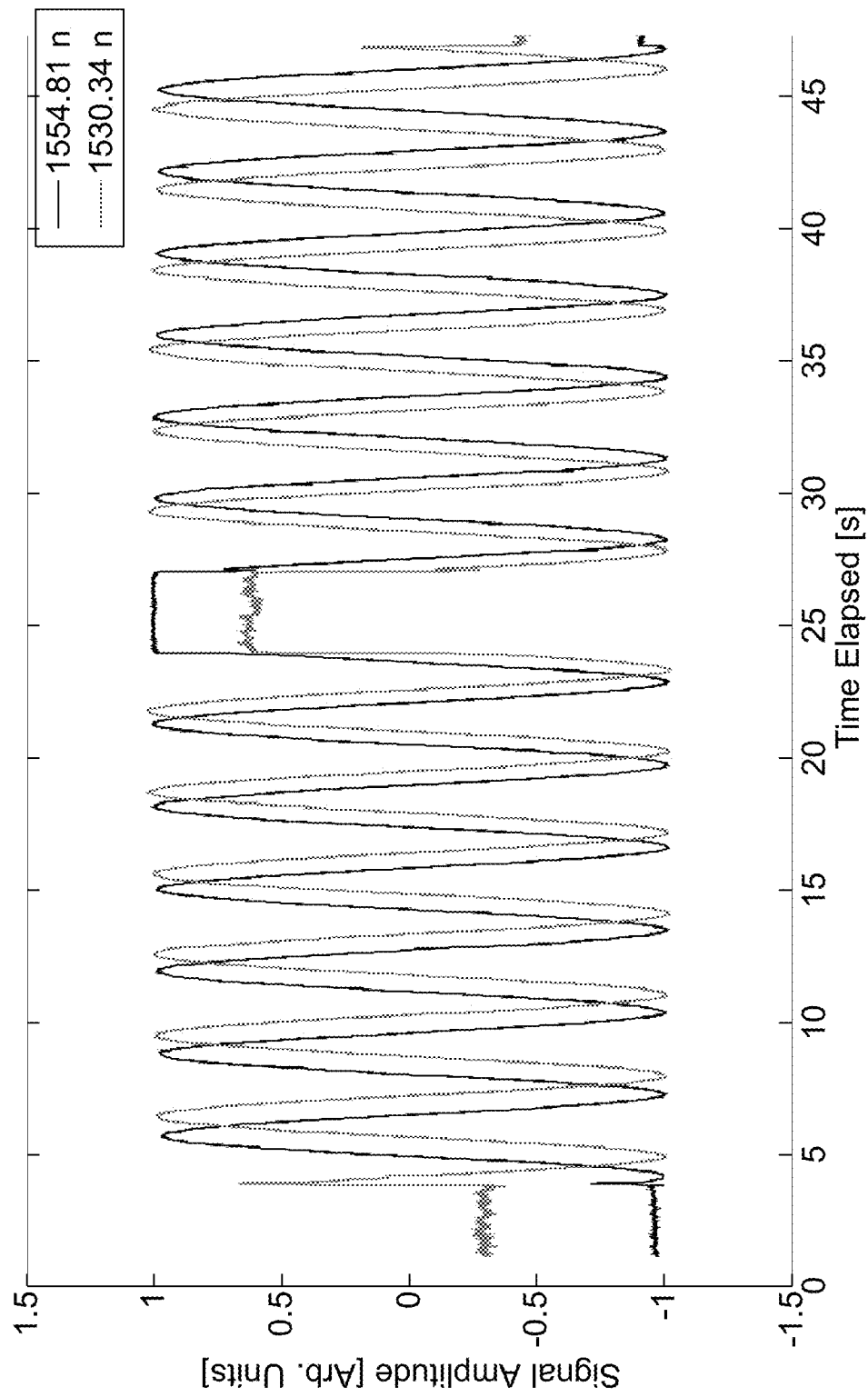
FIG. 15 is a graph showing an example of AC data (relative amplitude measurement data) detected during the high speed, dual fixed wavelength mode.
Figure 16:
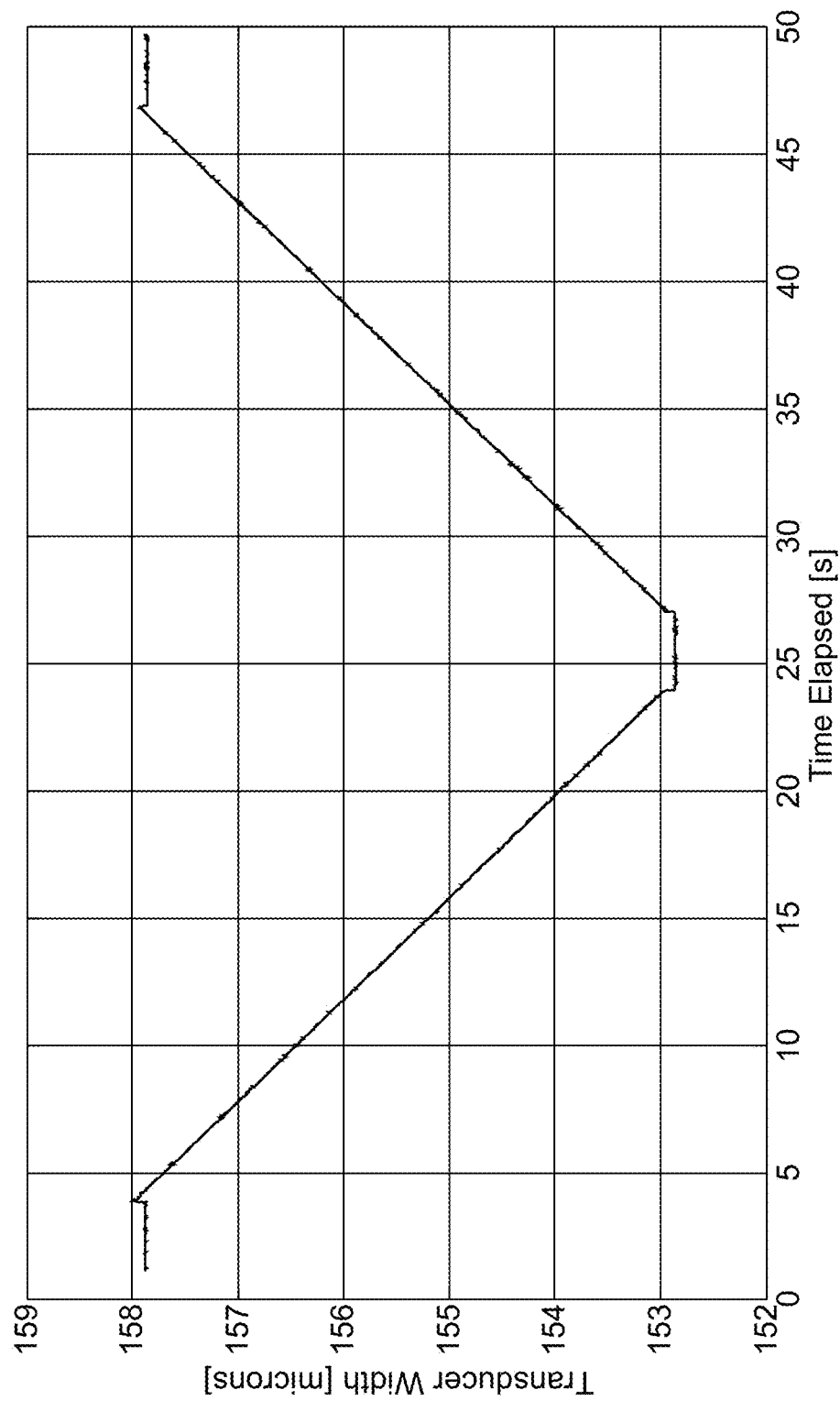
FIG. 16 is a graph showing an example where relative AC measurements of the sensor gap are referenced to baseline absolute DC measurements.

FIG. 16 shows a graph of calculated sensor width values from the data in FIG. 15 with the relative AC measurement values referenced to baseline absolute DC measurement values. These data demonstrate some of the merits of the disclosed technology and its ability to measure the absolute gap change of an EFPI sensor at high speeds with low latency. The control scheme enabling the two wavelengths to remain in quadrature with the EFPI gap changing over a large range is also advantageous for making accurate measurements by enabling a new wavelength at which to set the scanning laser for the resulting EFPI gap (OPL) to be determined.

Although various embodiments have been shown and described in detail, the claims are not limited to any particular embodiment or example. None of the above description should be read as implying that any particular member, step, range, or function is essential such that it must be included in the claims scope. The scope of patented subject matter is defined only by the claims. The extent of legal protection is defined by the words recited in the allowed claims and their equivalents. All structural and functional equivalents to the members of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A measuring method for use with an interferometric sensor, comprising:
   operating one or more light sources to provide light over a range of source wavelengths including providing light at three or more wavelengths to the interferometric sensor;
   determining a period of an interferometric amplitude response of an interferometric signal produced by the interferometric sensor over the range of source wavelengths;
   determining an absolute optical path length associated with the interferometric sensor based on the determined period of the interferometric amplitude response of the interferometric signal over the range of source wavelengths, where the optical path length varies depending on one or more physical parameters to be measured using the interferometric sensor;
   providing light at two or more selected wavelengths to the interferometric sensor, with two of the selected wavelengths having two different relative phases on the interferometric amplitude response;
   measuring a first interferometric amplitude response of an interferometric signal produced by the interferometric sensor at a first of the two or more selected wavelengths;
   measuring a second interferometric amplitude response of an interferometric signal produced by the interferometric sensor at a second of the two or more selected wavelengths;
   determining a relative optical path length change based on the first interferometric amplitude response at the first selected wavelength and the second interferometric amplitude response at the second selected wavelength;
   combining the absolute optical path length with the relative optical path length change to determine a current absolute optical path length; and
   generating a signal corresponding to the current absolute optical path length that relates to a current sensor measurand value or from which a current sensor measurand value is determined.

2. The method of claim 1, further comprising:
   using one or more lasers to provide light to the interferometric sensor including (i) three fixed wavelength lasers, (ii) a fixed wavelength laser and a tunable wavelength laser, or (iii) one tunable wavelength lasers.

3. The method of claim 2, further comprising modulating the one or more lasers to provide time varying illumination of the interferometric sensor.

4. The method of claim 3, wherein the time varying illumination includes changing the illumination at different wavelengths at different times.

5. The method of claim 4, further comprising:
   receiving, at a detector, light returning from the interferometric sensor, and
   discriminating light at different wavelengths based on the time at which the light is received.

6. The method of claim 3, wherein the modulating includes modulating the two or more lasers using one or more waveform signals at different frequencies.

7. The method of claim 6, further comprising:
   receiving, at a detector, light returning from the interferometric sensor, and
   discriminating light at different wavelengths based on the different frequencies of the one or more waveform signals.

8. The method of claim 2, further comprising:
   using more than two wavelengths of light to illuminate the interferometric sensor, and
   selecting two of the more than two wavelengths and determining a relative optical path length change based on a relative phase of the interferometric amplitude response at those wavelengths.

9. The method of claim 1, further comprising:
   performing the operating of the one or more light sources, the determining of the period of the interferometric amplitude response, and the determining of the absolute optical path length in a first mode of operation, and
   performing the providing of light at the two or more predetermined wavelengths to the interferometric sensor, the measuring of the first and second interferometric amplitude responses, and the determining of the relative optical path length change in a second mode of operation,
   wherein the first and second modes of operation are performed during the same time period or during different time periods.

10. The method of claim 9, further comprising:
    correcting information determined in the second mode of operation based on information determined during the first mode of operation.

11. The method of claim 1, further comprising:
splitting the light to multiple channels to illuminate multiple interferometric sensors, each of the multiple interferometric sensors having an associated light detector.

12. The method of claim 1, further comprising:
switching the light between multiple interferometric sensors, and
multiplexing a single detector to measure outputs from the multiple sensors.

13. A system for use with an interferometric sensor, comprising:
one or more light sources to provide light over a range of source wavelengths including providing light at three or more wavelengths to the interferometric sensor;
processing circuitry to:
determine a period of an interferometric amplitude response of an interferometric signal produced by the interferometric sensor over the range of source wavelengths;
determine an absolute optical path length associated with the interferometric sensor based on the determined period of the interferometric amplitude response of the interferometric signal over the range of source wavelengths, where the optical path length varies depending on one or more physical parameters to be measured using the interferometric sensor;
wherein the one or more light sources provide light at two or more selected wavelengths to the interferometric sensor, with two of the selected wavelengths having two different relative phases in the interferometric amplitude response;
wherein the processing circuitry is configured to:
measure a first interferometric amplitude response of an interferometric signal produced by the interferometric sensor at a first of the two or more selected wavelengths;
measure a second interferometric amplitude response of an interferometric signal produced by the interferometric sensor at a second of the two or more selected wavelengths;
determine a relative optical path length change based on the first interferometric amplitude response at the first selected wavelength and the second interferometric amplitude response at the second selected wavelength;
combine the absolute optical path length with the relative optical path length change to determine a current absolute optical path length; and
generate a signal corresponding to the current absolute optical path length that relates to a current sensor measurand value or from which a current sensor measurand value is determined.

14. The system of claim 13, wherein:
the one or more light sources comprises one or more lasers to provide light to the interferometric sensor,
wherein the one or more lasers include at least three fixed wavelength lasers, a fixed wavelength laser and a tunable wavelength laser, or at least one tunable wavelength lasers.

15. The system of claim 14, wherein the one or more light sources is adapted for modulation or coupled to or with a modulator to provide time varying illumination of the interferometric sensor.

16. The system of claim 15, wherein the time varying illumination includes changing the illumination at different wavelengths at different times.

17. The system of claim 16, further comprising:
a detector to receive light returning from the interferometric sensor,
wherein the processing circuitry is configured to discriminate light at different wavelengths based on the time at which the light is received.

18. The system of claim 16, wherein the one or more light sources is adapted for modulation or coupled a modulator to modulate the light at different wavelengths using one or more waveform signals at different frequencies.

19. The system of claim 18, further comprising:
a detector to receive light returning from the interferometric sensor,
wherein the processing circuitry is configured to discriminate light at different wavelengths based on the different frequencies of the one or more waveform signals.

20. The system of claim 14, wherein the processing circuitry is configured to:
use more than two wavelengths of light to illuminate the interferometric sensor,
select two of the more than two wavelengths for processing based on a relative phase of the interferometric amplitude response at those wavelengths.

21. The system of claim 13, wherein the system is configured to:
operate the one or more light sources, determine the period of the interferometric amplitude response, and determine the absolute optical path length in a first mode of operation, and
provide light at the two or more predetermined wavelengths to the interferometric sensor, measure the first and second interferometric amplitude responses, and determine the relative optical path length change in a second mode of operation,
wherein the first and second modes of operation are capable of being performed during the same time period or during different time periods.

22. The system of claim 21, wherein the processing circuitry is configured to:
correct information determined in the second mode of operation based on information determined during the first mode of operation.

23. The system of claim 13, further comprising:
a splitter to split the light to multiple channels to illuminate multiple interferometric sensors, each of the multiple interferometric sensors having an associated light detector.

24. The system of claim 13, further comprising:
one or more switches to switch the light between multiple interferometric sensors and to multiplex a single detector to measure outputs from the multiple sensors.

* * * * *